United States Patent
Vignisson et al.

(10) Patent No.: US 9,134,215 B1
(45) Date of Patent: Sep. 15, 2015

(54) SENTIMENT ANALYSIS OF CONTENT ITEMS

(71) Applicant: Jive Software, Inc., Portland, OR (US)

(72) Inventors: Jon Edvald Vignisson, Reykjavik (IS); Gunnar Holmsteinn Gudmundsson, San Francisco, CA (US); Sverrir A. Berg, Reykjavik (IS)

(73) Assignee: Jive Software, Inc., Palo Alto, CA (US)

( * ) Notice: Subject to any disclaimer, the term of this patent is extended or adjusted under 35 U.S.C. 154(b) by 179 days.

(21) Appl. No.: 13/673,813

(22) Filed: Nov. 9, 2012

(51) Int. Cl.
*G06N 5/04* (2006.01)
*G01N 5/04* (2006.01)

(52) U.S. Cl.
CPC .................................. *G01N 5/04* (2013.01)

(58) Field of Classification Search
CPC .......................................... G06N 5/04
USPC .......................................... 706/45
See application file for complete search history.

(56) References Cited

U.S. PATENT DOCUMENTS

| | | | |
|---|---|---|---|
| 7,523,085 B2 | 4/2009 | Nigam et al. | 706/55 |
| 7,600,017 B2 | 10/2009 | Holtzman et al. | 709/224 |
| 7,725,414 B2 | 5/2010 | Nigam et al. | 706/45 |
| 2010/0150393 A1 | 6/2010 | Ni et al. | 382/100 |
| 2011/0112995 A1 | 5/2011 | Chang et al. | 706/12 |
| 2012/0041953 A1 | 2/2012 | Dumais et al. | 707/739 |
| 2012/0179751 A1 | 7/2012 | Ahn et al. | 709/204 |

OTHER PUBLICATIONS archieved webpage from clarabridged.com, Jan.-Nov. 2011, 25 pages total.*

* cited by examiner

*Primary Examiner* — Lut Wong
(74) *Attorney, Agent, or Firm* — Klarquist Sparkman, LLP

(57) ABSTRACT

Disclosed herein is technology for providing sentiment analysis of content items. The technology involves labeling one or more portions of a content item and having the content item analyzed for sentiment. A graphical user interface may accept inputs from a user that indicate a portion of the content item should be labeled and the use may provide an associated sentiment for the item, e.g., positive, negative, or neutral. When a user has labeled a portion of a content item and provided an associated sentiment, the label and the sentiment are stored in a data store and the content items in the data store may be re-analyzed the content item to reflect the user's labeling and the changes are displayed in near real-time in the user interface.

20 Claims, 6 Drawing Sheets

SENTIMENT ANALYSIS OF CONTENT ITEMS

FIELD

The disclosure relates to sentiment analysis of content, typically content found online.

BACKGROUND

Many consumers express their opinions about products and services on the Internet. Indeed, review sites such as Yelp.com are built on user reviews. Companies that pay attention to what their customers are saying about their products and services can adapt or change designs in the next product cycle or contact unsatisfied customers of existing products to ensure that their satisfaction is maintained.

Aside from product review sites, many customers express their sentiment toward a product or service using means that aren't as quantifiable as a review site with numbered or graded ratings. For example, a customer may post a comment on a company's support message board about a video game stating "I love this game," or "it has great graphics, but needs a better story." These posts often do not have an empirical rating system that may be used to gauge how strongly the customer feels. The customer may also express their feelings and opinions on a message board unaffiliated with the company, or on social media sites such as Facebook or Twitter.

SUMMARY

The technology described herein provides a near real-time sentiment analysis of content. The content may be obtained from the Internet, from an Intranet, or from similar electronic methods of communicating. A given piece of content, also known as a content item, may come from a number of content sources. For example, content items may include, but are not limited to: comments on a web forum or discussion thread, blog posts, twitter feeds or "tweets", email conversations, survey answers, and/or status updates and subsequent comments on a social networking site.

One aspect of the disclosure relates to a system for providing near real-time sentiment analysis. In some implementations, the system includes a data store that includes multiple content items and multiple labels, both system-generated labels and labels provided by users of the system. The system may also include one or more processors that may be configured to execute computer program modules. The program modules may include, but are not limited to: a sentiment analysis module, an interface module, a content management module, an author profiling module, a weighting module, a content item retrieval module, and/or other modules.

In some implementations there may be a content item retrieval module. The content retrieval module may be configured to read content from a content source and add the content to the data store.

In some implementations, a sentiment analysis module may be configured to analyze the content items in the data store, identify one or more portions of a given content item to be labeled with labels, and assign a sentiment score to the labeled portions. In some versions, an interface module may be configured to define a graphical user interface. The graphical user interface may be configured to display the content item that was labeled, and may also be configured to receive an entry and/or selection of inputs from a user that label a portion of the content item. The entry or selection of inputs, in some versions, may modify or delete an existing label or create a new label. The graphical user interface may also be configured to receive a sentiment from the user for the labeled portion.

In some implementations, there may be a content management module. The content management module may be configured to, responsive to the user providing the sentiment for the labeled portion, update the data store to include the received label. The content management module may also be configured to instruct the sentiment analysis module to re-analyze the content items in the data store and to instruct the interface module to update the graphical user interface.

In some versions, there may also be a weighting module. The weighting module may be configured to assign a weight to the label provided by the user such that when the sentiment analysis module analyzes the content items, the sentiment score for the user-labeled content item is based in part on the weight.

The graphical user interface may provide various ways of presenting information about the content items and associated sentiments to a user. For example, in some implementations, the graphical user interface may be configured to display one or more charts to the user that show the respective sentiment scores of the content items over time, e.g., over the past week, month, or year. In some versions, the graphical user interface may be configured to display a graphic showing one or more labels, where the size of the graphic for a label is based on how often the label is used or how strong the sentiment for that label is or on the sentiment score for that label.

In some implementations, there may also be an author profiling module. The author profiling module may be configured to identify an author of a content item and create a profile of the author. The profile may include an author sentiment score and statistics on the author's activity, e.g., a frequency of how often the author creates content, e.g., writing posts or comments, answering surveys, or posting statuses on social networking sites. In some versions, the graphical user interface may be configured to display the profile of the author.

In one aspect, there may also be a method, executed on a computer processor, for providing near real-time sentiment analysis. In some versions, the method may involve retrieving a content item from a content source. The method may also involve labeling one or more portions of a content item with a system-generated label. The labeled portions and the content item as a whole may be analyzed for sentiment. The labeled portions may be assigned a sentiment score, and the content item may also be assigned a sentiment score. In some implementations, a graphical user interface displays the content item and then, a user-specified label for a user-selected portion of the content item and a user-specified sentiment for the labeled portion are received via the graphical user interface. In some instances, the content item is re-analyzed to update the sentiment score for the labeled portion and the content item as a whole, responsive to receiving the user-specified label and user-specified sentiment. In some cases, the graphical user interface displays then the updated sentiment.

There may also be versions that include identifying an author of a content item and creating an author profile of the author. The author profile may include an author sentiment score and statistics on the activity of the author. Once the profile is created, the graphical user interface may display the author profile.

In some implementations, the method may also involve assigning a weight to a portion of a content item that is labeled with a system-generated label. The method may also involve assigning a weight to a user-selected portion of the content item that the user has labeled and to the content item itself. In some versions, the sentiment scores for the portion labeled with the system-generated label, the user-selected portion, and the content item are based in part on the weights assigned to each.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
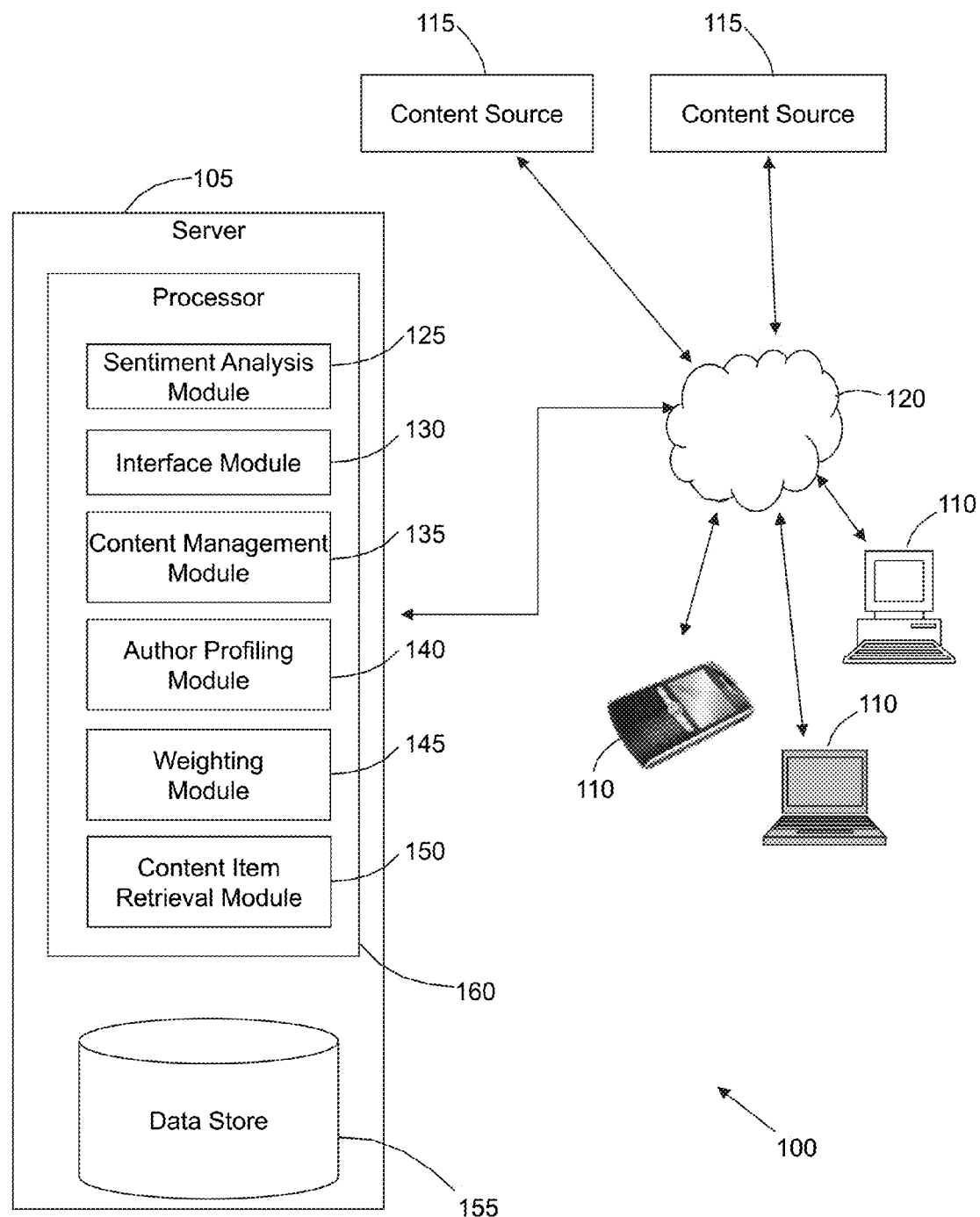
FIG. 1 illustrates a system configured to provide near real-time sentiment analysis of content items.

FIG. 1 illustrates a system 100 configured to provide near real-time sentiment analysis of content items. System 100 may enable users to view the sentiment associated with each content item as well as providing a graphical user interface that allows the user to label words and phrases in a content item for sentiment. When a user of the system adds a new label or modifies an existing label, the system may automatically update the existing sentiment analysis for the content items so that the user can see the changes in near real-time.

In some implementations, system 100 may include a server 105. Server 105 may be configured to communicate via one or more electronic communication links with one or more client computing platforms 110 and/or content sources 115 according to a client/server architecture communicated over a network 120, e.g., the Internet, wide area network (WAN), local area network (LAN), or the like. The users may access system 100 via client computing platforms 110 and/or content authors may use client platforms 110 to interact with content sources 115.

Server 105 may be configured to execute one or more computer program modules. The one or more computer program modules may include one or more of a sentiment analysis module 125, an interface module 130, a content management module 135, an author profiling module 140, a weighting module 145, a content item retrieval module 150, and/or other modules.

A given client computing platform 110 may include one or more processors, an electronic display, a control interface, and/or other components. The one or more processors may be configured to execute computer program modules. The computer program modules may be configured to enable a user associated with the given client computing platform 110 to interface with system 100, and/or provide other functionality attributed herein to client computing platforms 110. For example, the computer program modules may include a view module configured to receive view information from server 105 (e.g., generated by interface module 130), and to present a graphical user interface to the user based on the received view information. By way of non-limiting example, the given client computing platform 110 may include one or more of a desktop computer, a laptop computer, a handheld computer, a tablet computing platform, a NetBook, a Smartphone, a gaming console, and/or other computing platforms.

Server 105 may include electronic storage 155, one or more processors 160, and/or other components. Server 105 may include communication lines, or ports to enable the exchange of information with a network and/or other computing platforms. Illustration of server 105 in FIG. 1 is not intended to be limiting. Server 105 may include a plurality of hardware, software, and/or firmware components operating together to provide the functionality attributed herein to server 105. For example, server 105 may be implemented "in the cloud" by a plurality of computing platforms operating together as server 105.

Electronic storage 155, or colloquially a "data store," may be implemented in a number of ways. In some implementations, electronic storage 155 is a relational database. A relational database may include a number of tables that each have one or more columns and one or more rows. Electronic storage 155 may comprise electronic storage media that electronically stores information. The electronic storage media of electronic storage 155 may include one or both of system storage that is provided integrally (i.e., substantially non-removable) with server 105 and/or removable storage that is removably connectable to server 105 via, for example, a port (e.g., a USB port, a firewire port, etc.) or a drive (e.g., a disk drive, etc.). Electronic storage 155 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 155 may include one or more virtual storage resources (e.g., cloud storage, a virtual private network, and/or other virtual storage resources). Electronic storage 155 may store software algorithms, information determined by processor 160, information received from server 105, information received from client computing platforms 110, and/or other information that enables server 105 to function as described herein. Content items may be stored in any of data store 155 implementations described above.

To obtain the content items, the content item retrieval module 150 may be configured to retrieve content items from a content source 115 over a network 120, e.g., over the Internet, and load them into the data store 155. Depending on the content source 115, the content items may be retrieved by one or more of: performing HTTP GET/POST requests, by making a database query to the content source, e.g., a SQL SELECT statement, by requesting a Real Simple Syndication ("RSS") feed, by making a Web Services or Simple Object Access Protocol ("SOAP") request, by Application Programming Interface ("API") calls to the content source, by web scraping or screen scraping, and/or other techniques. The content retrieval module 150 may then parse the results of the request into content items using standard text parsing techniques, and the content retrieval module may then store the content items in the data store 155.

Sentiment analysis module 125 may be configured to analyze the content items once the content items are stored in the data store 155. The sentiment analysis module 125 may also be configured to identify one or more portions of a content item that is to be labeled with a label from the labels stored in the data store 155. These labels may be predefined as part of the system or may have been provided by the user prior to, or concurrent with, the sentiment analysis module 125 analyzing the content items. Labels that are predefined may be well-known words or phrases that have established meanings within the language. Examples of labels that may be predefined are "good", "bad", "fantastic", "terrible", and other expressive words used to convey a positive feeling towards a product, a negative feeling towards a product, or a sentiment that falls between positive and negative. Customers may use slang terms though that are not part of the standard language identifiable by the system as conveying sentiment. To supplement the predefined labels, the system 100 also provides a way for a user to define and/or modify labels so that new terms, e.g., product-specific words or phrases, slang, or jargon used by the consumers of a product, are included in the sentiment analysis. Examples of labels that may be provided by the user are "killer" (positive sentiment), "the bomb" (positive sentiment), "weaksauce" (negative sentiment), and "terribad" (negative sentiment).

In some implementations, the sentiment analysis module 125 may also be configured to assign a sentiment score to the labeled portions of a content item and in some versions, the content item itself. The sentiment score may reflect how strongly the content item author feels based on the words or phrases found in the content item. For example, in some implementations, the range of sentiment scores may be $-1.00$ (most negative sentiment) to $+1.00$ (most positive sentiment), with sentiment in between being a floating point decimal. A labeled word such as "terribad"—a slang amalgam of "terrible" and "bad"—may have a sentiment score of $-1.00$. A labeled word such as "meh", a phrase that is often an expression of apathy, indifference, or boredom, may have a sentiment score of $-0.25$ because it is not a strongly negative statement, and instead is closer to a neutral response with negative undertones. Similarly, "decent" may have a sentiment score of $+0.5$, indicating a generally favorable sentiment, but not a maximally positive sentiment. In some versions, the sentiment scores assigned to the labels can then be aggregated to generate an overall sentiment score for the content item. For example, if a content item has the words "terribad", "meh", and "decent" in it, the sentiment analysis module 125 may give the content item an overall sentiment score of $-0.75$, e.g., $(-1.00)+(-0.25)+(+0.5)$. The author of the content item may have a generally negative attitude about the product, having used multiple negative words, but the use of "decent" may indicate the maximally negative sentiment is not warranted.

In some implementations, the sentiment of the labeled words or phrases may be imparted to specific features of the product or topics of the discussion. For example, if the word "graphics" is found near "terribad", the sentiment analysis module 125 may assign the maximally negative sentiment to just the graphics feature. Similarly, if words such as "plot" or "story" are found near the word "decent", the sentiment analysis module 125 may assign a generally positive sentiment to only the story feature. Some implementations use known sentiment analysis techniques or tools to achieve this, e.g., sentiment analysis libraries provided by OpenNLP or LingPipe, or algorithms developed by researchers Peter Turney or Bo Pang, and/or other techniques. The foregoing are merely examples of some implementations of a sentiment scoring methodology, and other ranges, e.g., 1 to 10, other grading schemes, e.g., A to F, or enumerated coding schemes, e.g., 1 star to 5 stars, and how overall sentiment for a content item may be calculated using labeled words and phrases may also be used. Other forms of scoring and/or aggregation to determine a content item level score from scores of portions of the content item's content are contemplated Interface module 130 may be configured to define a graphical user interface, which may be configured to display content items stored in the data store and their associated sentiment scores. The users may interact with the graphical user interface via applications being executed on client computing platforms 110.

When interacting with the graphical user interface provided by the interface module 130, a user may provide, and the graphical user interface receives, an entry and/or a selection of inputs to indicate labeling of a portion of the content item and a sentiment for the labeled portion. For example, the word "horribad", an amalgam of "horrible" and "bad" and a variation of "terribad," may appear in a content item but may not currently be in the data store 155 as a label. The user knows that "horribad" is a negative term and is able to select or highlight the word in the graphical user interface, e.g., through keyboard input, mouse input, touchscreen input, and/or voice commands or hand gestures, to designate "horribad" as a label that should be analyzed for sentiment and strength of the sentiment. Once the word or phrase is highlighted and designated as a label, the user may be prompted to provide a sentiment for the newly-labeled word or phrase. The user may indicate, and the graphical user interface receives, that "horribad" is a negative phrase, also through keyboard input, mouse input, touchscreen input, and/or voice commands or hand gestures. While in some implementations the user simply indicates a positive, negative, or neutral sentiment for a label and the sentiment score for the label is determined during the sentiment analysis (by the sentiment analysis module 125), in some versions, the user may also provide a sentiment score to indicate how strongly positive, negative, or neutral the label is. The user's highlighting and providing of sentiment is expressly not limited to new phrases; the entry and/or selection of inputs that label a portion of the content item for sentiment may include modifying or deleting an existing label. For example, whereas "bad" traditionally indicates a negative sentiment, in some communities "bad" may have a positive sentiment. In these cases, a user may view a content item in the graphical user interface, determine that "bad" in the context of the content item is in fact expressing a positive sentiment, and then alter the sentiment assigned to "bad" from negative to positive. The user may also choose to delete known labels because that word or phrase may just not be a part of the consumer community's vernacular.

In some implementations, the graphical user interface defined by the interface module 130 is further configured to display one or more charts that show statistics related to the sentiment of the community. For example, in some implementations there is a chart that shows the sentiment of the community over time, e.g., that shows how sentiment has trended positively or negatively over the past year. This allows a user to see if business actions have impacted the community, e.g., a new product release may cause an increase in positive sentiment if the release went well. If the release went poorly, the sentiment may change from positive or neutral before the release and then dip negatively after the release as customers complained about the new product. Other informational graphics may also be presented via the graphical user interface, e.g., a label "cloud" may be shown, where a number of labels are displayed together, but the size of the any one label is based on how often that label is used by content item authors. For example, "great" is a common phrase, whereas "terribad" may not be. In the label cloud, "great" may appear next to or near "terribad" but be shown in a font that is several times larger than the font used for "terribad." This may give user a quick visual reference for which words or phrases are often being used when discussing the product. In some implementations, the label "cloud" may be generated automatically and show the most used words that are relevant and meaningful to a user of the system.

Content management module 135 may be configured to, responsive to the user providing the sentiment for a labeled portion, update the data store 155 to include the received label and sentiment provided by the user. That is, the content management module 135 receives the labeled word or phrase from the interface module 130 (by way of the graphical user interface) and stores the new or modified label in the data store 155 using commands appropriate for the data store 155 implementation, e.g., a SQL update or insert statement where the data store is implemented as a relational database. During sentiment analysis, this will allow the sentiment analysis module 125 to examine other content items in the data store 155 for the same words or phrases (and therefore sentiment) even though the content items with those words or phrases were not explicitly labeled by the user. If the input from the user related to a label is to delete the label, in some versions the label is deleted from the data store 155. In other implementations, the label is not necessarily removed from the data store 155. Instead, the sentiment associated with that label may not be factored into the sentiment analysis of that specific content item or, in some versions, of any content item that contains the deleted label.

The content management module 135 may also be configured to instruct the sentiment analysis module 125 to re-analyze the content items in the data store 155 after the user has labeled the content item and/or submitted sentiment for the label. This causes the sentiment analysis module 125 to reevaluate the sentiment of the content items and overall sentiment in near real-time so that after a user applies a label to a content item, he or she may see the effect on the sentiment immediately because the interface module 130 is instructed to update the graphical user interface.

Figure 2A:
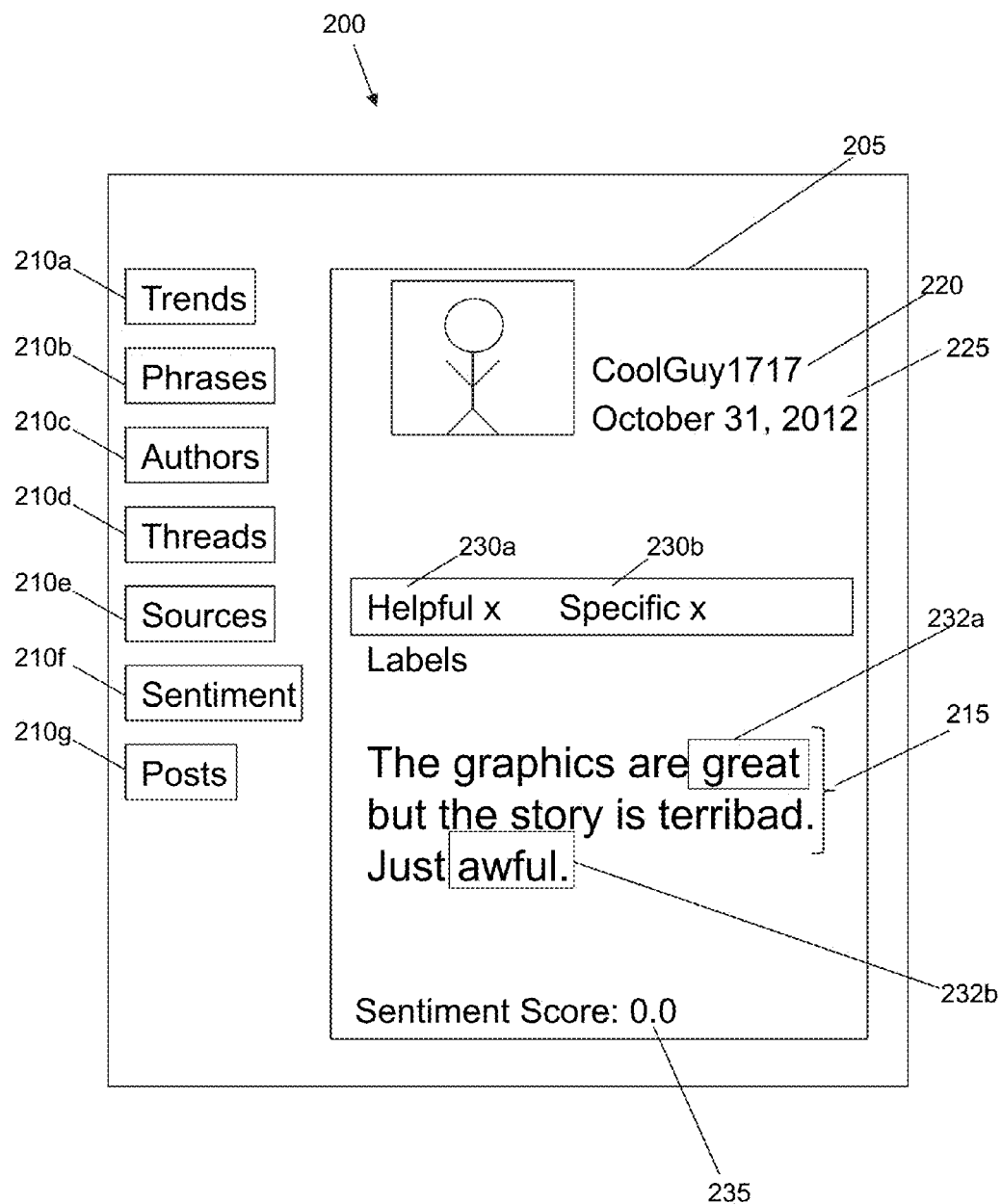
FIGS. 2A, 2B, 2C, and 2D show an exemplary graphical user interface where a user selects and labels a word, assigns a sentiment, and the sentiment score for the content item is updated.

FIG. 2A shows one implementation of a graphical user interface 200, where a content item 205 is displayed. Other implementations may be arranged differently, e.g., in a horizontal configuration as opposed to the vertical orientation shown in FIG. 2A and may have more or fewer features. The graphical user interface 200 has menu options for Trends 210a, Phrases 210b, Authors 210c, Threads 210d, Sources 210e, Sentiment 210f, and Posts 210g. Each of the menu options, when selected by the user via, e.g., mouse or keyboard or touchscreen input, show a page to the user related to that menu option. The graphical user interface 200 shown is a post, and so is accessed by selecting Posts 210g. The content item 205 shown displays the text 215 of the content item, the author 220 of the content item, the date 225 the content item was posted, labels 230a, 230b that are currently associated with the content item, and the sentiment score 235 of the content item. The labels 230a, 230b (collectively 230) associated with the content item are shown in a text box, which may be determined by the system or entered by the user using, e.g., mouse, keyboard, or touchscreen input, to provide additional information about the post, for example, that the post is "helpful" 230a and "specific" 230b. In some implementations, labels 230 may reflect the sentiment of the content item 205, e.g., "positive", "negative," or the like. Each label 230a, 230b in the label box has an option to delete the label by the user selecting the "x" next to the label to be deleted. Portions 232a, 232b (collectively 232) show labels that have already been associated with the content item. As shown, "great" 232a is labeled, as is "awful" 232b. In some implementations, the highlighting of a portion 232 reflects the associated sentiment, e.g., green highlighting indicates a positive sentiment has been associated with the labeled word or phrase and red highlighting indicates a negative sentiment. In FIG. 2A, the sentiment score 235 is 0.0 because the author of the content item used both "great" (strong positive sentiment) and "awful" (strong negative sentiment), which, in this case, cancel each other out.

Figure 2B:
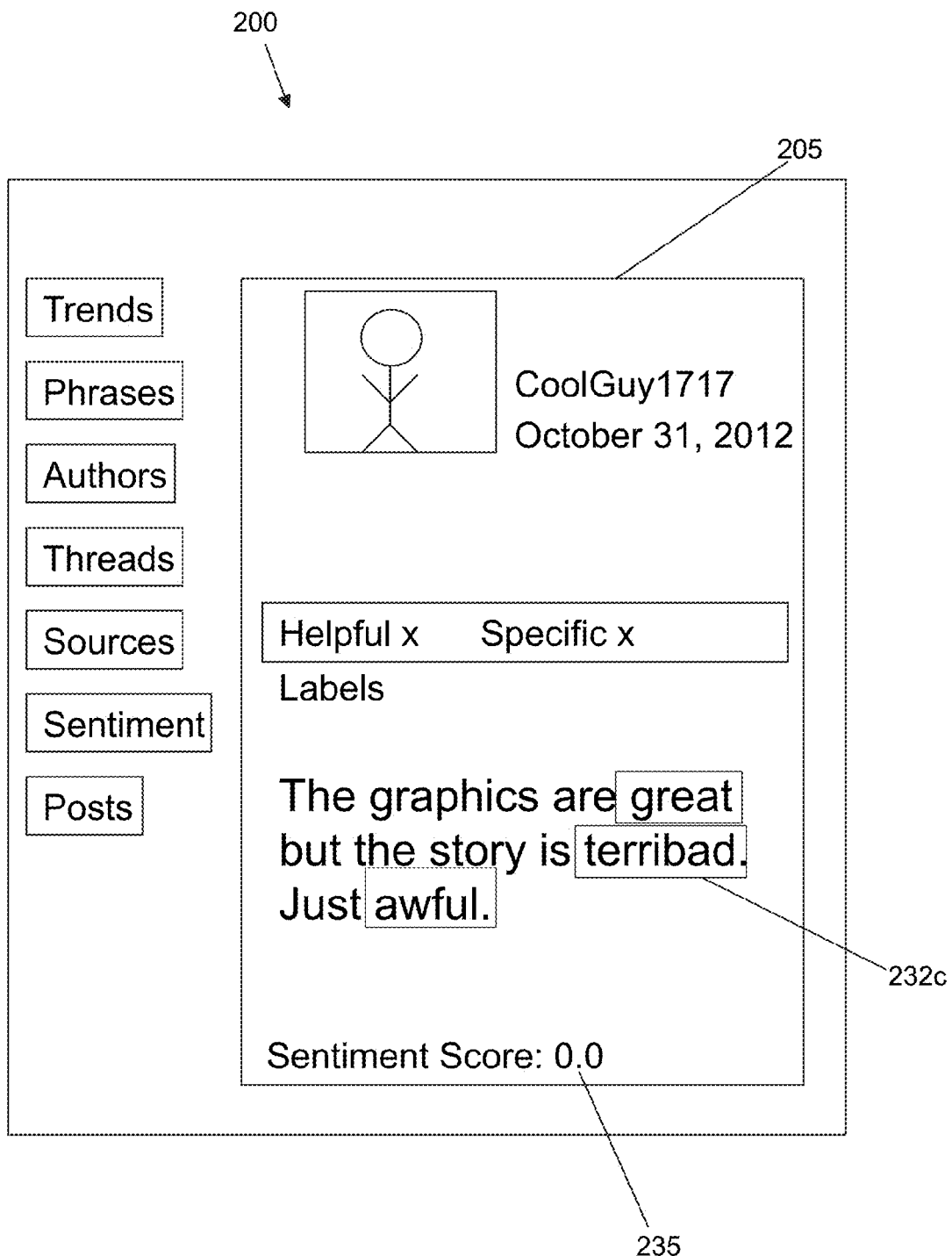

A user of system 100 though notes that "terribad" is in the text 215 of content item and wishes to label it to accurately reflect the sentiment of the author. FIG. 2B shows that the user has highlighted, e.g., via mouse or keyboard or touchscreen input, or the like, the word "terribad" 232c in the content item text. In FIG. 2B, the sentiment score 235 is still 0.0 because no sentiment has been associated with the "terribad" label 230c yet.

Figure 2C:
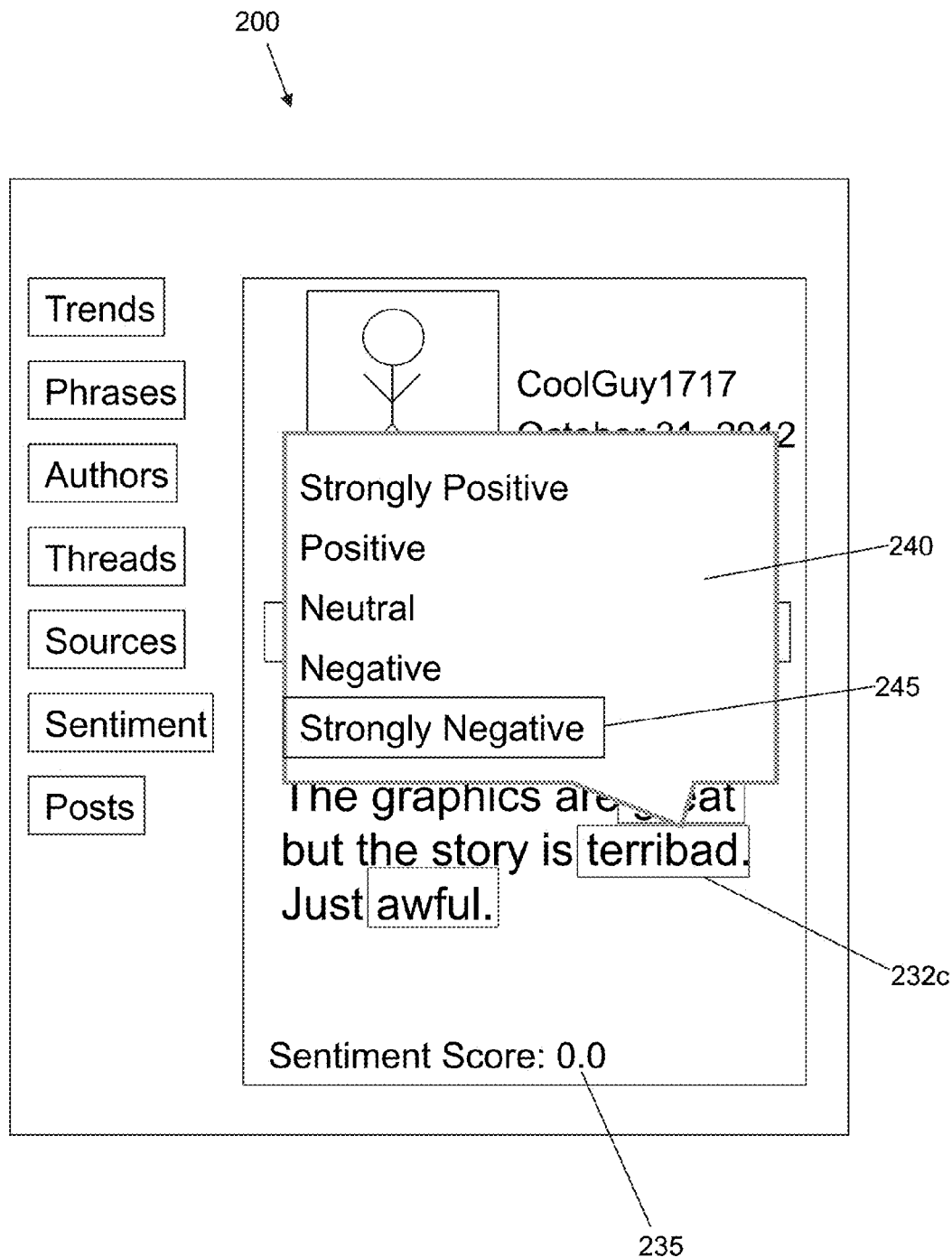
Figure 2D:

Referring now to FIG. 2C, when the user highlights "terribad," it becomes a labeled portion and the user is prompted via, e.g., a popup window 240, to designate the label as having a sentiment, e.g., strongly positive, positive, neutral, negative, or strongly negative. In FIG. 2C, the user has indicated 245 by selecting via, e.g., mouse or keyboard or touchscreen input, that the label should have a strongly negative sentiment. In FIG. 2D, the sentiment score 235 for the content item is updated to reflect the additional sentiment scoring. Whereas in FIG. 2A, the sentiment score 235 of the content item 205 was 0.0 because "great" and "awful" canceled each other out, the terribad label that was created and the corresponding sentiment associated with it, has made the overall sentiment of the content item negative. Thus, the sentiment score 235 in FIG. 2D after the terribad label was created is −0.5. Although FIGS. 2A, 2B, 2C, and 2D show various parts of the graphical user interface, not all parts are necessarily displayed and are listed herein for descriptive purposes only. For example, in some implementations, the sentiment score 235 is not displayed and is instead a "behind the scenes" data value used only for charting purposes. In some implementations, highlighting the word "terribad" causes a label for "terribad" to appear in the label box. In some implementations the user can type in a different label for the highlighted word, e.g., if the author mistyped "terribad" in the content item but the user knew it should be labeled that way.

Referring back to FIG. 1, author profiling module 140 may be configured to store profile information associated with individual content item authors. The profile information may include information stored by server 105, one or more of the client computing platforms 110, information available from the content sources 115, and/or other storage locations. The profile information may also include, for example, information identifying users (e.g., a username or handle, a number, an identifier, and/or other identifying information), content source 115 account information, relationship information (e.g., information related to relationships between authors or users of the content source), demographic information associated with authors, interaction history among authors or users of the content source, information stated by the author, a client computing platform identification associated with an author, a phone number associated with an author, a sentiment score associated with the author, statistics on how often the author creates content items on the content source, e.g., how frequently the author creates content items, and/or other information related to authors. In some implementations, the graphical user interface may request profile information from the author profiling module 140 for a particular author, e.g., by way of an API, or HTTP GET/POST request, via a SOAP message, or the like, and then the graphical user interface displays the profile for the author. This allows a user of the system 100 to interact with the information described above, e.g., filter the information for a particular phrase or keyword, limit the information viewed to a particular time frame or window of time, view the sentiment score of the author over time, and/or other methods of interacting with the data.

In some versions, there is also a weighting module 145. The weighting module 145 may be configured to assign a weight to a label such that when the sentiment analysis module 125 analyzes content items in the data store 155, the sentiment score for content items with that label is based in part on the weight given to that label. In some versions, the weighting of a label may change over time. For example, as a term is used more and more frequently, it may grow in importance as more and more customers incorporate that word or phrase into their vocabulary. Conversely, as a word or phrase is used more and more, a user of the system 100 may wish for the weight of that label to decline over time because it is a compliment or a complaint that is known and therefore should not strongly skew sentiment towards the positive or negative side. The weighting is an implementation-specific decision made by a user of the system or the sentiment analysis module 125. In the case of the user, the graphical user interface provided by the interface module 130 may have a text entry, menu drop down, or similar input that the user interacts with to designate the desired weight that should be applied. In the case of the sentiment analysis module 125 determining if a weight should increase or decline, during analysis—as the occurrence of a labeled word or phrase increases across the number of content items in the data store 155—the sentiment analysis module 125 may assign a greater or lesser weight as appropriate.

Processor(s) 160 is configured to provide information processing capabilities in server 105. As such, processor 160 may include one or more of a digital processor, an analog processor, a digital circuit designed to process information, an analog circuit designed to process information, a state machine, and/or other mechanisms for electronically processing information. Although processor 160 is shown in FIG. 1 as a single entity, this is for illustrative purposes only. In some implementations, processor 160 may include a plurality of processing units. These processing units may be physically located within the same device, or processor 160 may represent processing functionality of a plurality of devices operating in coordination. The processor 160 may be configured to execute modules 125, 130, 140, 145, and/or 150. Processor 160 may be configured to execute modules 125, 130, 140, 145, and/or 150 by software; hardware; firmware; some combination of software, hardware, and/or firmware; and/or other mechanisms for configuring processing capabilities on processor 160.

It should be appreciated that although modules 125, 130, 140, 145, and/or 150 are illustrated in FIG. 1 as being co-located within a single processing unit, in implementations in which processor 160 includes multiple processing units, one or more of modules 125, 130, 140, 145, and/or 150 may be located remotely from the other modules. As a non-limiting example, some or all of the functionality attributed to modules 125, 130, 140, 145, and/or 150 may be provided "in the cloud" by a plurality of processors connected through a network. The description of the functionality provided by the different modules 125, 130, 140, 145, and/or 150 herein is for illustrative purposes, and is not intended to be limiting, as any of modules 125, 130, 140, 145, and/or 150 may provide more or less functionality than is described. For example, one or more of modules 125, 130, 140, 145, and/or 150 may be eliminated, and some or all of its functionality may be provided by other ones of modules 125, 130, 140, 145, and/or 150. As another example, processor 160 may be configured to execute one or more additional modules that may perform some or all of the functionality attributed below to one of modules 125, 130, 140, 145, and/or 150. Modules 125, 130, 140, 145, and/or 150 may execute on one server, on multiple distinct servers, there may be a server for each respective module, or the modules may be combined in any number of permutations to execute on any number of servers. Furthermore, server 105 may be a hardware server or it may be a process with a designated memory space executed on a hardware processor.

It will be appreciated that illustration in FIG. 1 and the description herein of modules 125, 130, 140, 145, and/or 150 being provided for implementation with a sentiment analysis system is not intended to be limiting. In some implementations, one or more of modules 125, 130, 140, 145, and/or 150 may provide the functionality described herein for a plurality of separate sentiment analysis systems. Such implementations may reduce redundancy of an entity that provides a plurality of different sentiment analysis systems to users, e.g., different clients that wish to analyze the sentiment associated with their respective products. In such implementations, the one or more of modules 125, 130, 140, 145, and/or 150 that are provided to serve a plurality of different sentiment analysis systems may be executed in a separate server from the server(s) executing the interface module.

Figure 3:
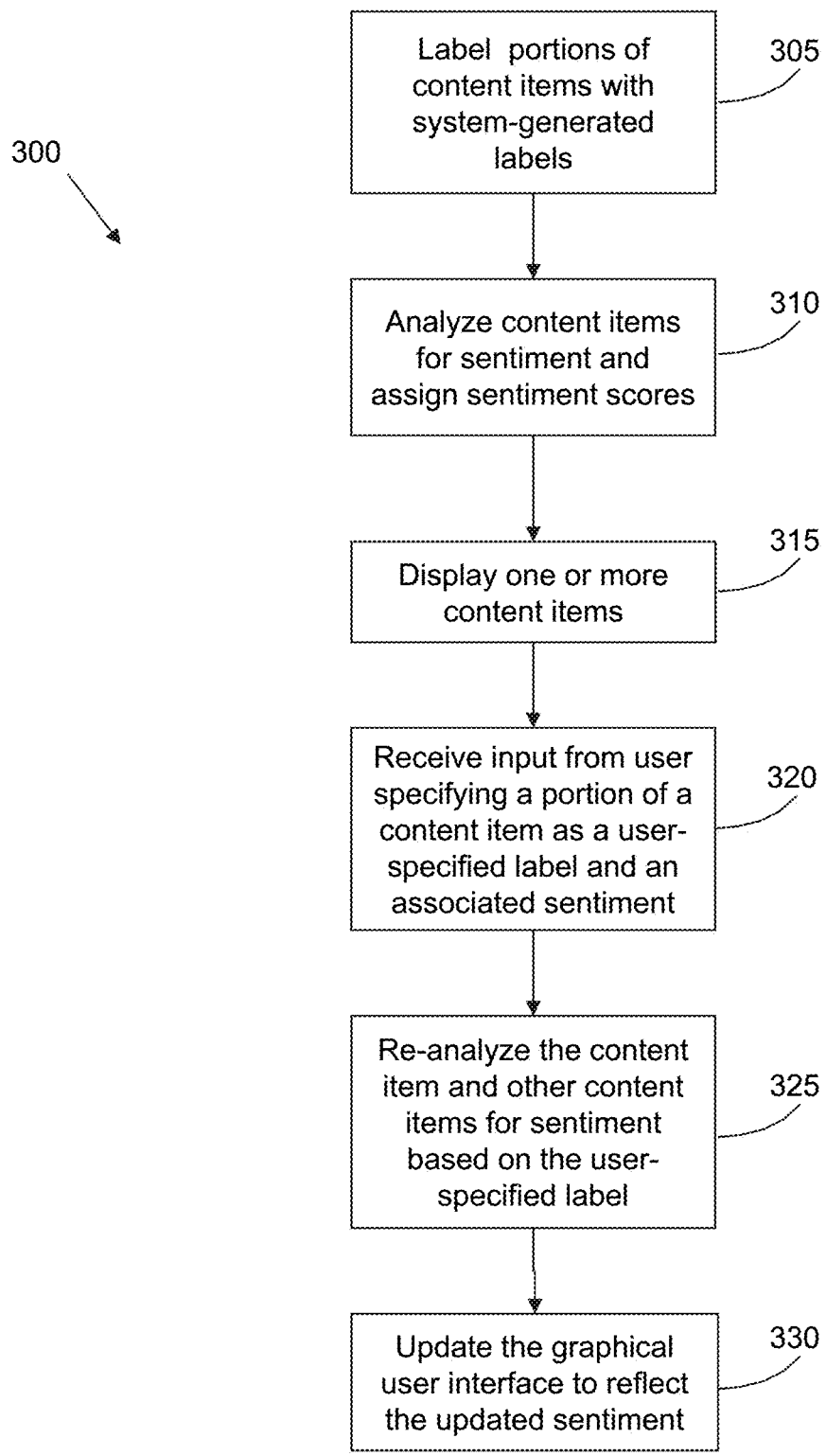
FIG. 3 depicts a method, executed on a computer processor, for providing near real-time sentiment analysis of content items.

FIG. 3 depicts a method 300, executed on a computer processor, e.g., processor 160, for providing near real-time sentiment analysis. The method 300 begins assuming that there are already content items loaded into a data store, e.g., electronic storage 155. At operation 305, one or more portions of a content item are labeled with a system-generated label. This is the initial identification of labels in the respective content items. Then, at operation 310, the one or more labeled portions and the content item are analyzed for sentiment and a sentiment score is assigned to the labeled portions in a content item and to the content item itself. At operation 315 a graphical user interface is caused, e.g., by the interface module 130, to display one or more of the content items. Then, at operation 320, a user-specified label for a user-selected portion of the content item is received via the graphical user interface from the user, as is a user-specified sentiment for the labeled portion. Then, responsive to receiving the user-specified label and user-specified sentiment from operation 320, the content item is re-analyzed—as are the other content items in the data store—at operation 325 to update the sentiment score for the labeled portion and the content item. Then graphical user interface is caused, e.g., by the interface module 130, to display the updated sentiment at operation 330.

In some implementations not shown, the method 300 may also include identifying an author of a particular content item. In these implementations, an author profile is created for the author, which may include an author sentiment score and one or more statistics on activity of the author, e.g., how often the author logs in, how often the user writes comments, writes blog posts, how the author typically answers surveys, or otherwise expresses sentiment. The author sentiment score is a score similar to the score given to a content item by the sentiment analysis module 125, but the author sentiment score is based on the content items that the author has written. In some versions, the author sentiment score is an overall score, spanning all of the author's content items. In other versions, the author sentiment score may be divided into sentiment towards specific products or features of products or discussion topics. For example, an author may always have a negative opinion about any products' graphics and thus the author sentiment score for that author for a graphics feature would be a negative sentiment score. The author profile, including the author sentiment scores and the statistics about the author's activity may be stored in the data store 155. Once the author profile has been created, the graphical user interface may be made, e.g., by the interface module 130, to display the author profile.

In some versions of method 300 not shown, the method may also include a weighting aspect, e.g., much like that executed by the weighting module 145, where some labels are given more or less sentiment strength depending on how they are weighted. The weighting aspect of the method includes assigning a weight to a portion of a content item that is labeled with the system-generated label. There may be another weight applied to labels that are provided by users, e.g., labels that were user-selected portions of the content item. These weights may then be applied to the sentiment score for the system-labeled portion, the user-labeled portion, and, in some implementations, the content item as a whole. Weighting in this manner may allow for more sentiment deference to a user's judgment in labeling a portion of the content item over that provided by a system-labeled portion.

As described above, there is, in some implementations, there may also be an operation performed to get the content items from a content source, e.g., content source 115, into the data store, e.g., data store 155. In those cases, the content item is retrieved from the content source before the portions of the content item are labeled with system-generated labels using retrieval techniques such as HTTP GET/POST requests, by making a database query to the content source, e.g., a SQL SELECT statement, by requesting a RSS feed, by making a Web Services or SOAP request, by API calls to the content source, by web scraping or screen scraping, and/or other techniques. In some implementations, the operation for retrieving the content items is handled by the content retrieval module 150.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing sentiment analysis comprising:
   a data store comprising a plurality of content items and a plurality of labels, wherein the plurality of content items comprises a first content item and wherein the plurality labels comprises a first label;
   one or more processors configured to execute computer program modules, the computer program modules comprising:
      a sentiment analysis module, configured to analyze the plurality of content items, identify one or more portions of the first content item to be labeled with the first label, and assign a sentiment score to the one or more labeled portions;
      an interface module, configured to define a graphical user interface, the graphical user interface being configured to display the first content item, the graphical user interface being further configured to receive an entry and/or selection of inputs that label a portion of the first content item and provide a sentiment for the labeled portion;
      a content management module configured to, responsive to the user providing the sentiment for the labeled portion, update the data store to include the received label and further configured to instruct the sentiment analysis module to re-analyze the plurality of content items to update the sentiment score and to instruct the interface module to update the graphical user interface with the updated sentiment score, wherein the re-analyzing comprises searching all content items in the data store, identifying content items containing the received label, and recalculating the sentiment score for the at least one content item;
      a weighting module configured to assign a weight to the first label proportional to the frequency of the first label such that when the sentiment analysis module re-analyzes the plurality of content items, the sentiment score for the first content item is based in part on the weight, wherein the sentiment score varies dependent on a frequency of the first label.

2. The system of claim 1 wherein the entry and/or selection of inputs that label a portion of the content item for sentiment comprises an entry and/or selection of inputs that modify or delete an existing label or create a new label.

3. The system of claim 1 wherein the graphical user interface is further configured to display one or more charts showing the sentiment score over time of the plurality of content items.

4. The system of claim 1 wherein the graphical user interface is further configured to display a graphic showing the first label, wherein the size of the graphic is based on how often the first label is used.

5. The system of claim 1 wherein the graphical user interface is further configured to display a graphic showing the first label, wherein the size of the graphic is based on the sentiment score for the first label.

6. The system of claim 1 further comprising:
   an author profiling module configured to identify an author of a content item and create a profile of the author comprising an author sentiment score and statistics on a frequency of content authoring; and
   wherein the graphical user interface is further configured to display the profile of the author.

7. The system of claim 6, wherein the author profile further comprises:
   author relationship information;
   author demographic information; and
   author interaction history.

8. The system of claim 6, wherein the author sentiment score is computed from the sentiment scores of all of the author's content items.

9. The system of claim 1 further comprising a content item retrieval module configured to read content from a content source via a network connection and add the content to the data store.

10. A method, executed on a computer processor, for providing sentiment analysis, the method comprising:
    labeling one or more portions of a content item with a system-generated label;

analyzing the one or more labeled portions and the content item for sentiment and assigning a sentiment score to a first labeled portion of the one or more labeled portions and to the content item;

causing a graphical user interface to display the content item;

receiving, via the graphical user interface, a user-specified label for a user-selected portion of the content item and a user-specified sentiment for the user-specified label;

responsive to receiving the user-specified label and user-specified sentiment, searching a data store comprising a plurality of content items to identify content items comprising the user-specified label;

re-analyzing the identified content items to update their sentiment scores based on the user-specified sentiment score; and causing the graphical user interface to display the updated sentiment score of the content item.

11. The method of claim 10, further comprising:

identifying an author of a content item;

creating an author profile of the author comprising an author sentiment score and one or more statistics on an activity of the author; and causing the graphical user interface to display the author profile.

12. The method of claim 11, wherein the profile of the author further comprises:

author relationship information;

author demographic information; and author interaction history.

13. The method of claim 11, wherein the author sentiment score is computed from the sentiment scores of all of the author's content items.

14. The method of claim 10, further comprising assigning a first weight to a first portion of the one or more portions labeled with the system-generated label and a second weight to the user-selected portion, wherein the second weight is greater than the first weight such that the sentiment score for the first portion labeled with the system-generated label is decreased relative to the sentiment score for the user-selected portion.

15. The method of claim 10, further comprising retrieving the content item from a content source via a network connection before the one or more portions of the content item are labeled with a system-generated label.

16. A non-transitory computer-readable storage having instructions stored thereon for executing a method, the method comprising:

labeling one or more portions of a content item with a system-generated label;

analyzing the one or more labeled portions and the content item for sentiment and assigning a sentiment score to a first labeled portion of the one or more labeled portions and to the content item;

causing a graphical user interface to display the content item;

receiving, via the graphical user interface, a user-specified label for a user-selected portion of the content item and a user-specified sentiment for the user-specified label;

responsive to receiving the user-specified label and user-specified sentiment, searching a data store comprising a plurality of content items to identify content items comprising the user-specified label;

re-analyzing the identified content items to update their sentiment scores based on the user-specified sentiment score; and causing the graphical user interface to display the updated sentiment score of the content item.

17. The non-transitory computer-readable storage of claim 16, further comprising:

identifying an author of a content item;

creating an author profile of the author comprising an author sentiment score and one or more statistics on an activity of the author; and causing the graphical user interface to display the author profile.

18. The method of claim 17, wherein the profile of the author further comprises:

author relationship information;

author demographic information; and author interaction history.

19. The non-transitory computer-readable storage of claim 16, further comprising assigning a first weight to a first portion of the one or more portions labeled with the system-generated label and a second weight to the user-selected portion, wherein the second weight is greater than the first weight such that the sentiment score for the first portion labeled with the system-generated label is decreased relative to the sentiment score for the user-selected portion.

20. The non-transitory computer-readable storage of claim 16, further comprising retrieving the content item from a content source via a network connection before the one or more portions of the content item are labeled with a system-generated label.

* * * * *